United States Patent [19]

Kabayama

[11] Patent Number: 4,778,040
[45] Date of Patent: Oct. 18, 1988

[54] FRICTION CLUTCH AND COVER WITH BALANCING MEANS

[75] Inventor: Yoshiaki Kabayama, Hirakata, Japan

[73] Assignee: Kabushiki Kaisha Daikin Seisakusho, Osaka, Japan

[21] Appl. No.: 13,809

[22] Filed: Feb. 12, 1987

[30] Foreign Application Priority Data

Feb. 13, 1986 [JP]  Japan .................. 61-19023[U]

[51] Int. Cl.⁴ .............................................. F16D 13/75
[52] U.S. Cl. ..................... 192/110 R; 192/30 V; 192/70.13; 192/DIG. 1; 74/573 R
[58] Field of Search ............. 192/30 V, 70.13, 110 R, 192/DIG. 1; 74/573 R; 301/5 B; 29/1 D

[56] References Cited

U.S. PATENT DOCUMENTS

| | | | |
|---|---|---|---|
| 4,417,651 | 11/1983 | Lu | 301/5 B X |
| 4,591,041 | 5/1986 | Valier | 74/573 R X |
| 4,611,702 | 9/1986 | Kayakabe et al. | 192/110 R |

FOREIGN PATENT DOCUMENTS 2539491  3/1977  Fed. Rep. of Germany ... 192/30 V

*Primary Examiner*—Leslie A. Braun
*Assistant Examiner*—Richard M. Lorence
*Attorney, Agent, or Firm*—Armstrong, Nikaido, Marmelstein & Kubovcik

[57] ABSTRACT

A friction clutch includes side plates connected to an output hub and being adapted to receive a torque through a friction facing from a flywheel of an engine, and a clutch cover supporting a control mechanism of the clutch. At least one of the clutch cover and the side plates is integrally provided at outer peripheral portions with small portions which are surrounded by a groove and a slot connected to the groove so that one or more of the small portions can be removed for balancing the clutch in an unbalance-correcting process. The side plates are rigidly connected together by stop pins and are connected to the hub through springs disposed in openings formed in the side plates and a radial flange of the hub. One of the side plate is provided at outer peripheral portions circumferentially between the openings and the stop pins with the small portions.

3 Claims, 2 Drawing Sheets

FIG. 5
FIG. 6
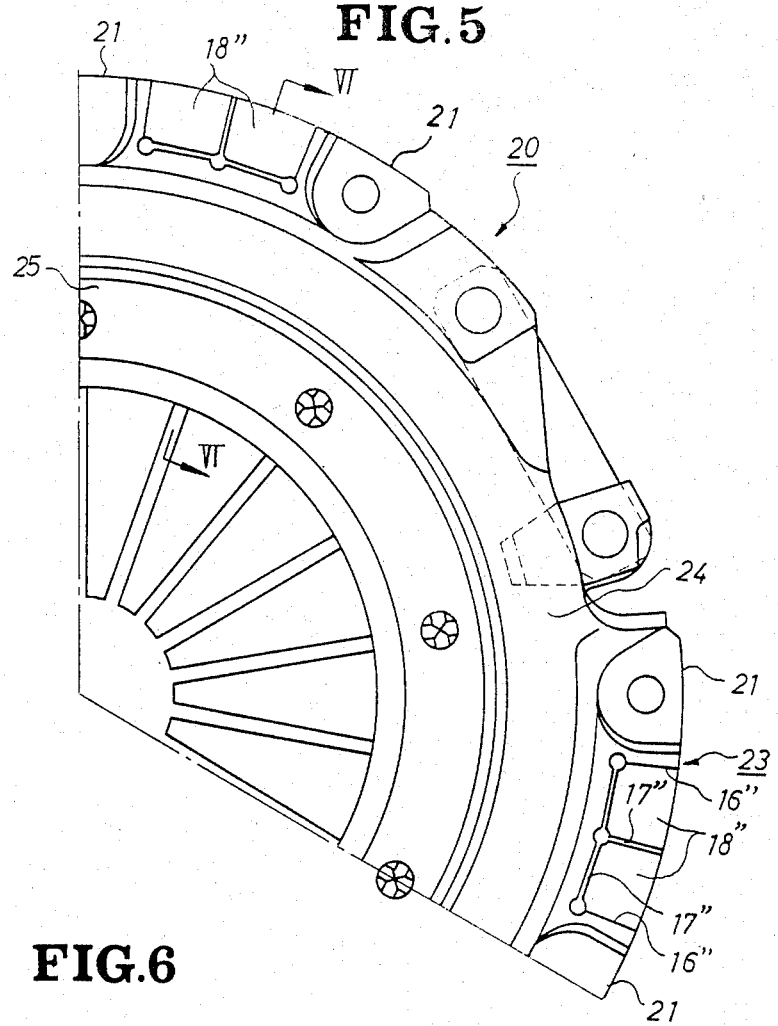
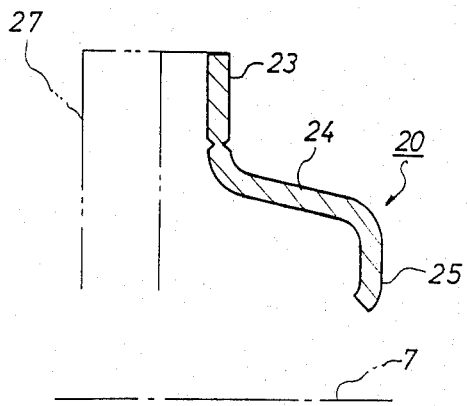

FRICTION CLUTCH AND COVER WITH BALANCING MEANS

BACKGROUND OF THE INVENTION

The present invention relates to a friction clutch for automobiles, and more particularly, to a friction clutch including a small portion to be cut off for correcting unbalance of the clutch with respect to the center axis thereof in an assembly process.

Generally, a friction clutch for an automobile comprises a clutch disc having a friction facing to be pressed onto the flywheel, a control mechanism, i.e., spring-/lever mechanism, for pressing the facing through a pressure plate onto a flywheel of an engine, and a clutch cover fixed to the flywheel and supporting the control mechanism. These members and parts rotate around a common axis, i.e., a center line of an output shaft. Accordingly, it is necessary to balance them around the axis for long durability and good performance of the clutch.

In a known assembly process, a balancing rivet (or rivets) is fixed to a clutch plate of the clutch disc or the friction facing is partially cut away for balancing the disc.

However, the balancing rivet causes unpreferable increase of the weight and inertia of the disc, and further, requires several steps in the manufacturing process.

On the other hand, in the method for balancing the disc by partially cutting off the facing, it is necessary to use a grinder, which increases the whole structure of an apparatus for correcting the unbalance. This method also requires several steps in the manufacturing process.

Accordingly, it is an object of the invention to provide an improved structure of the clutch, overcoming the above-noted disadvantages.

SUMMARY OF THE INVENTION

The essence of the invention is to provide a clutch, in which at least one of a clutch cover and side plates is integrally provided at outer peripheral portions with small portions which are surrounded by a groove and a slot connected to the groove so that one or more of said small portions can be removed for balancing the clutch in an unbalance-correcting process.

Other and further objects, features and advantages of the invention will appear more fully from the following description of the preferred embodiments of the invention.

BRIEF DESCRIPTION OF THE INVENTION

FIG. 5 is a fragmentary plane view of a disc of still another embodiment of the invention;

FIG. 6 is a schematic sectional view taken along line VI—VI in FIG. 5.

DETAILED DESCRIPTION OF THE PREFERRED EMBODIMENT

Figure 1:
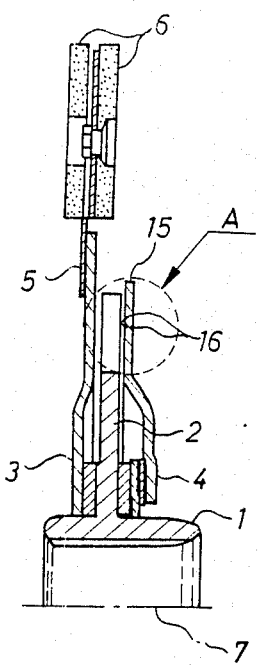
FIG. 1 is a fragmentary sectional view of an embodiment of the invention.
Figure 2:
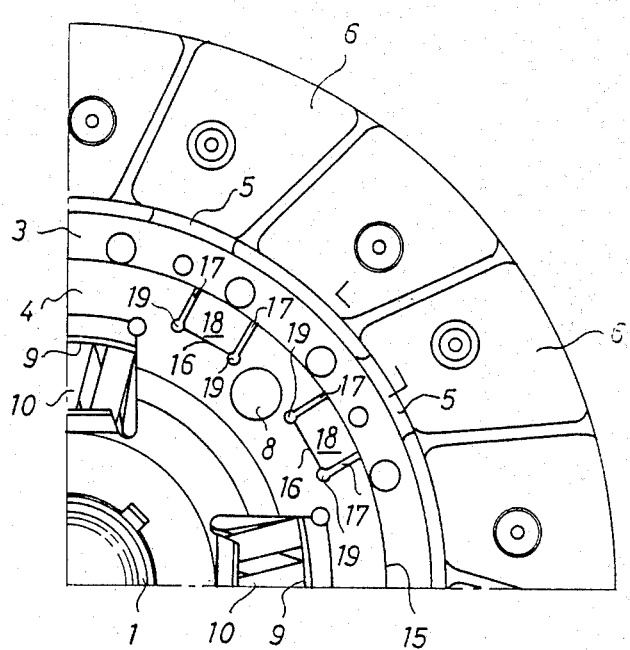
FIG. 2 is a schematic plane view of the disc in FIG. 1.

Referring to FIG. 1, a hub 1 adapted to be splined onto an output shaft 7 (only a center line of which is illustrated) has a radial flange 2. A pair of angular side plates 3 and 4, i.e., a clutch plate (3) and a retaining plate (4) are disposed at opposite sides of the flange 2. The side plates 3 and 4 are rigidly fixed together by stop pins 8 (FIG. 2) and are circumferentially connected to the flange 2 through damper or torsion springs 10 (FIG. 2). A pair of friction facings 6 are fixed to circumferentially spaced cushioning plates 5, which are fixed to radially outer portions of the side plates 3. Each spring 10 is arranged in a set of axially aligned three openings 9 formed in the FIG. 2 and the side plates 3 and 4. These sets of the openings 9 are circumferentially spaced to each other, and said stop pins 8 are located at an intermediate position between circumferentially adjacent two openings 9.

Figure 3:
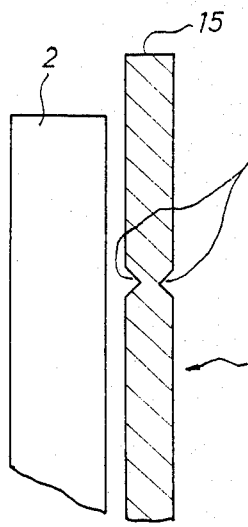
FIG. 3 is an enlarged view of a part indicated by an arrow A in FIG. 1.

The side plate 4 is provided at the vicinity of an outer periphery 15 thereof with grooves 16 and slots 17 or recesses. The grooves 16 are located between the openings 9 and the stop pins 8 and extend substantially in the tangential direction of the disc, respectively. The slots 17 extend nearly radially from opposite ends of each groove 16 to the outer periphery 15 of the side plate 4. Thus, the side plate 4 is provided with small rectangular portions 18 surrounded by the grooves 16 and the pairs of the slots 17, respectively. A small aperture 19 having a round periphery is formed between each slot 17 and the groove 16 so as to prevent concentration of the stress. As shown in FIG. 3, each groove 16 has a substantially V-shaped section. The groove 16 may have a U-shaped section or a rectangular section. The depth of each groove 16 is so determined that the small portion 18 is prevented from tearing off by a centrifugal force caused by the rotation of the disc.

An operation for correcting an unbalance is as follows. In this process, the balance of the disc is determined and checked by a known balancer, and then, an operator tears off one or more small portion 18 located at a detected unbalanced portion. The tearing off of the portion 18 can be facilely performed by pinching and bending several times the portion 18 by a conventional tool, such as pliers, to snap off the portion 18 at the bottom of the groove 16.

Although the small portions 18 in FIG. 2 are rectangular, they may be of other shape, such as a pentagon or a triangle.

Figure 4:
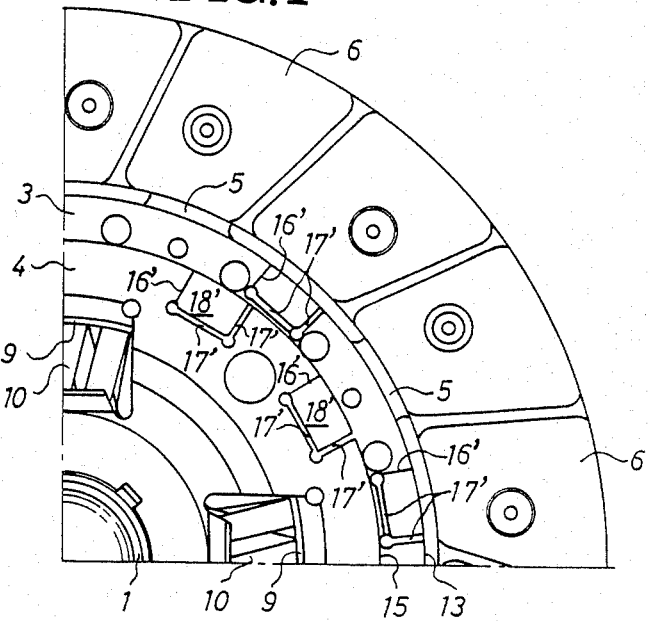
FIG. 4 is a fragmentary plane view of a disc of another embodiment of the invention.

In a modification illustrated in FIG. 4, the small portion 18 is surrounded by a nearly radially extending groove 16' and a L-shaped slot 17' consisting of a tangentially extending portion and a nearly radially extending portion.

In the embodiment in FIG. 4, the side plate 3 is also provided at outer peripheral portions between the cushioning plates 5 with grooves 16' and slots 17' similar to those in the side plate 4.

In a modification in FIGS. 5 and 6, a clutch cover 20 is provided with small portions 18" similar to those in FIG. 4. The clutch cover 20 includes an outer peripheral flange 23 to be fixed at portions 21 to a flywheel 27 (FIG. 6), a substantially cylindrical portion 24 and a substantially annular end wall 25 extending radially inwardly from the end wall 24.

Several pairs of the small portions 18" are formed at the flange 23 and are located between the adjacent fixing portions 21. Each pair of the small portions 18″ are surrounded by a pair of nearly radial grooves 16″ and a pair of tangential slots 17″, and are divided by a nearly radial slot 17″ which forms substantially T-shaped slot together with the tangential slots 17″.

The small portions 18 and/or 18′, 18″ may be formed in only one or two of the clutch cover 20 and side plates 3 and 4, or in all of them.

According to the invention, as described hereinbefore, at least one plate member, such as the side plate 3 or 4 or the clutch cover 20 is provided at the outer peripheral portions with small portions 18 to be cut or torn off for balancing the clutch. The peripheries of the portions 18 are formed by the grooves 18 (i.e., thin portions of the member) and the slots 17, so that they may be facilely torn off or cut off by, for example, bending them. Accordingly, the clutch can be facilely balanced only by removing the portion or portions 18 without increasing the weight and inertia thereof. Thus, the balancing process and installation can be simplified, as compared with the conventional balancing operation and installation.

Although the invention has been described in its preferred form with a certain degree of particularity, it is understood that the structure of the preferred form may be changed in the details of construction, and that the combination and arrangement of parts may be modified to without departing from the spirit and scope of the invention as hereinafter claimed.

What is claimed is:

1. A friction clutch including side plates connected to an output hub for receiving torque through a friction clutch facing and a clutch cover supporting a control mechanism for said clutch; at least one of said side plates being integrally provided at an outer peripheral portion with small removable portions, each of said small portions being defined on at least one side by a slot extending through said peripheral portion and being defined on another side by a groove forming a reduced thickness portion in said side plate connecting said small portion to said at least one of said side plates, so that one or more of said small portions may be broken off and removed for balancing the clutch in an unbalance-correcting process, said side plates being rigidly connected together by stop pins and are connected to the hub through springs disposed in openings formed in said side plates and a radial flange of said hub, and said at least one of said plates is provided at said outer peripheral portion circumferentially between said openings and said stop pins with said small portions.

2. A friction clutch of claim 1 wherein one of said side plates has outer peripheral fixing portions, to which cushioning plates for supporting said friction facing is fixed, and is provided with said small portions located circumferentially between said fixing portions.

3. A friction clutch including side plates connected to an output hub for receiving torque through a friction clutch facing and a clutch cover supporting a control mechanism for said clutch; at least one of said side plates being integrally provided at an outer peripheral portion with small removable portions, each of said small portions being defined on at least one side by a slot extending through said peripheral portion and being defined on another side by a groove forming a reduced thickness portion in said side plate connecting said small portion to said at least one of said plates, so that one or more of said small portions may be broken off and removed for balancing the clutch in an unbalance-correction process, said one of said side plates has outer peripheral fixing portions to which cushioning plates for supporting said friction facing are fixed and is provided with said small portions located circumferentially between said fixing portions.

* * * * *